United States Patent [19]

Tamamushi et al.

[11] 4,289,345
[45] Sep. 15, 1981

[54] LUGGAGE COMPARTMENT COVER APPARATUS FOR AN AUTOMOTIVE VEHICLE

[75] Inventors: Masahiro Tamamushi, Tokyo; Kazuo Katakura, Higashikurume, both of Japan

[73] Assignee: Nissan Motor Company, Limited, Yokohama, Japan

[21] Appl. No.: 109,643

[22] Filed: Jan. 4, 1980

[30] Foreign Application Priority Data

Jan. 16, 1979 [JP] Japan ................................. 54-4289

[51] Int. Cl.³ ............................................. B60R 7/04
[52] U.S. Cl. .................................. 296/37.16; 296/106
[58] Field of Search ................. 296/37.16, 106, 24 R, 296/100

[56] References Cited

U.S. PATENT DOCUMENTS 3,848,920 11/1974 Linhart ............................... 296/106
4,127,301 11/1978 Syrowik ........................... 296/37.16
4,202,578 5/1980 Roullier .............................. 296/106

FOREIGN PATENT DOCUMENTS 1518223 7/1978 United Kingdom ............. 296/37.16

*Primary Examiner*—David M. Mitchell
*Assistant Examiner*—John A. Carroll
*Attorney, Agent, or Firm*—Thompson, Birch, Gauthier & Samuels

[57] ABSTRACT

A luggage compartment cover apparatus for openably closing a luggage compartment which is formed on the rear portion of an automotive vehicle having a rear opening gradually narrowed in the upward and frontward direction. The luggage compartment cover can be opened and closed without causing interference by contacting the side edges thereof against back pillars, and can completely cover the luggage compartment. The luggage compartment cover apparatus comprises a luggage compartment cover, per se expansible at least in the lateral direction and guide means fixedly secured on the inner surface of a rear door for closing the rear opening. The rear sides of the luggage compartment cover are movably associated with the guide means so as to be expanded and contracted with respect to opening and closing of the luggage compartment cover.

8 Claims, 14 Drawing Figures

LUGGAGE COMPARTMENT COVER APPARATUS FOR AN AUTOMOTIVE VEHICLE

BACKGROUND OF THE INVENTION

The present invention relates to a luggage compartment cover apparatus for openably closing a luggage compartment of an automotive vehicle which is provided with a rear opening gradually narrowed in the upward and frontward direction along back pillars of the vehicle.

A rear door is hinged on the upper horizontal upper edge of the rear opening to be opened and closed thereby. The rear end of the luggage compartment cover is engaged to the rear door for cooperation according to closing and opening of the rear door. The front end of the luggage compartment cover is pivotally secured on the vehicle body adjacent to the seat back of a rear seat of the vehicle. Thus, the luggage compartment cover for openably closing the luggage compartment is cooperatively associated with the rear door.

The width of the luggage compartment, defined by both rear side panels of the vehicle body, is substantially same as that of the lower and rear end of the rear door. Therefore, to cover the luggage compartment entirely, the luggage compartment covers should be provided a width substantially same as that of the lower and rear end of the rear door. However, the luggage compartment cover having the width as abovementioned is apt to abut the side edge thereof against the inner edges of the back pillers, gradually reducing lateral spacing in the upper and front direction. The abutment between the luggage compartment cover and back pillars may cause interference of opening the luggage compartment cover cooperating with the rear door.

To eliminate such problems or difficulties, the conventional luggage compartment cover is provided on both sides thereof with cut-outs at the portions opposing the inner edges of the back pillers. Thereby, the interference related to opening the luggage compartment cover can be eliminated.

However, while such a luggage compartment cover satisfactorily avoids the interference caused by abutting the side edge thereof against the back pillars when opened with the rear door, there are formed gaps defined between the cut-outs and rear side panels, in the closed position of the luggage compartment cover. The luggage compartment and/or luggage contained in the luggage compartment are observable from the outside or subject to sunlight irradiation through the gaps.

In view of foregoing, the present invention is to provide a luggage compartment cover apparatus for openably closing a luggage compartment of a vehicle, having a luggage compartment cover which can entirely close the luggage compartment in closed position but eliminate interference caused by abutting of the side edge thereof against inner edges of the back pillers when opened.

SUMMARY OF THE INVENTION

Therefore, it is an object of the present invention to provide a luggage compartment cover apparatus which has a luggage compartment cover being expansible at least in the lateral direction.

Another object of the invention is to provide a luggage compartment cover apparatus having means for guiding the luggage compartment cover to expand and contract in lateral direction.

Another object of the invention is to provided a luggage compartment cover apparatus in which the luggage compartment cover has means to cooperatively associate with the guide means so as to smoothly slide therealong and to be expanded and contracted with respect to opening and closing of the rear door.

To achieve the above-mentioned objects, a luggage compartment cover apparatus according to the invention has a luggage compartment cover expansible at least in the lateral direction. The front end of the luggage compartment cover is pivotally associated with the seat back of a rear seat of a vehicle and the rear end thereof is movably connected with guide means fixed on the inner surface of a rear door in parallel relationship with the inner edge of back pillars. Thereby, the luggage compartment cover is expanded and contracted by moving along the guide means, when the rear door is closed and opened.

The other objects, features and advantages of the invention will be understood by the following description.

BRIEF DESCRIPTION OF THE DRAWINGS

The present invention will be illustrated more fully by way of examples with reference to accompanying drawings, in which.

DESCRIPTION OF THE PREFERRED EMBODIMENT

Figure 1:
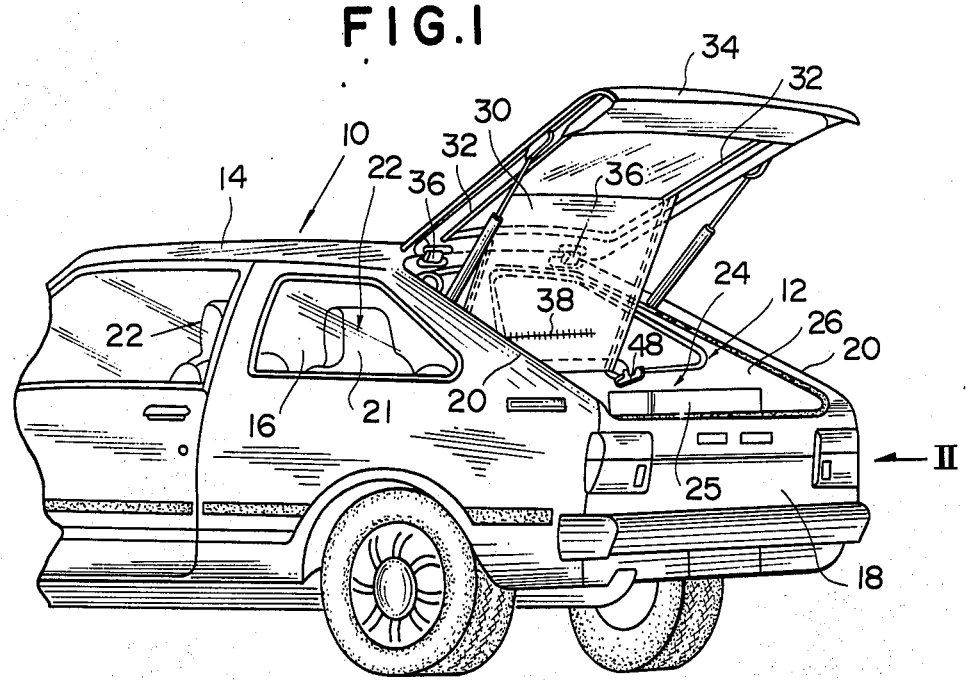
FIG. 1 is a perspective view of a rear portion of a vehicle having a luggage compartment cover apparatus according to the first embodiment of the invention with the rear door being in opened position.
Figure 2:
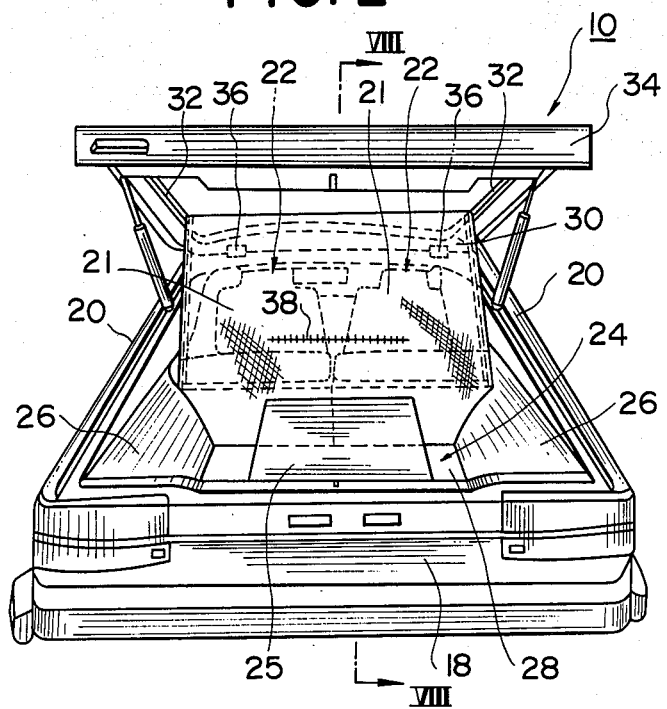
FIG. 2 is a rear elevation of the vehicle of FIG. 1 viewed along arrow II.
Figure 3:
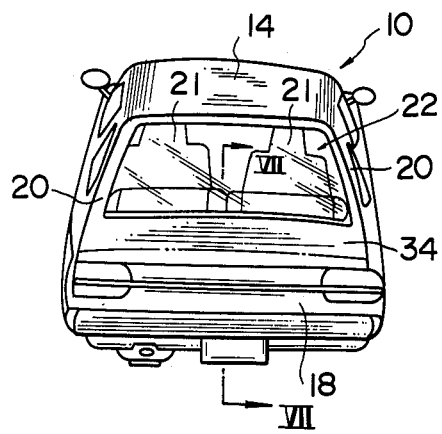
FIG. 3 is a rear elevation of the vehicle of FIG. 1, the rear door being in closed position.

Referring now to the drawings, particularly to FIGS. 1 to 3, there is illustrated generally a rear portion of an automotive vehicle 10. The vehicle is provided with a rear opening 12 which is defined by the rear end of a roof 14 of vehicle chamber 16, rear end panel 18 and a pair of back pillars 20. As the back pillars 20 are respectively inclined inwardly in upward and frontward directions, the lateral spacing of the opening 12 is gradually narrowed therealong.

On the portion between rear seats 22 and the rear end panel 18, there is formed a luggage compartment 24 for receiving luggage 25 therein. The luggage compartment 24 is defined by the rear seats 22, a pair of rear side panels 26, rear end panel 18 and a floor panel 28 and is openably closed by a luggage compartment cover 30 which is made of flexible and/or expansible material. In practice, the luggage compartment cover may formed with any flexible, stretchable or expansible material, such as web, synthetic resin sheet, rubber sheet and so on to be expansible or stretchable at least in the lateral direction. The front end of the luggage compartment cover 30 is connected to brackets 48 fixed on the rear side panels 26 at portions adjacent to the seat back 21 of the rear seat 22. The rear end of the luggage compartment cover 30 is slidably associated with a pair of guide rails 32 fixedly provided on the inner surface of a rear door 34 in parallel relationship to respective sides edge of the door 34. The rear door 34 is connected by hinges 36 to the vehicle body at the upper edge thereof so as to openably close the rear opening 12. Since the side edges of the rear door 34 are inclined to be adapted to the back pillars 20, the lateral spacing between the guide rail 32 is gradually narrowed in upward or frontward direction.

As shown in FIGS. 1 and 2, the luggage compartment cover 30 is provided at a substantially central portion thereof with a zipper type fastener 38, which forms an opening through which luggage 25 may be passed. Thus by opening the fastener 38, access may be had to the luggage compartment even when the luggage compartment cover 30 is closed.

Figure 4:
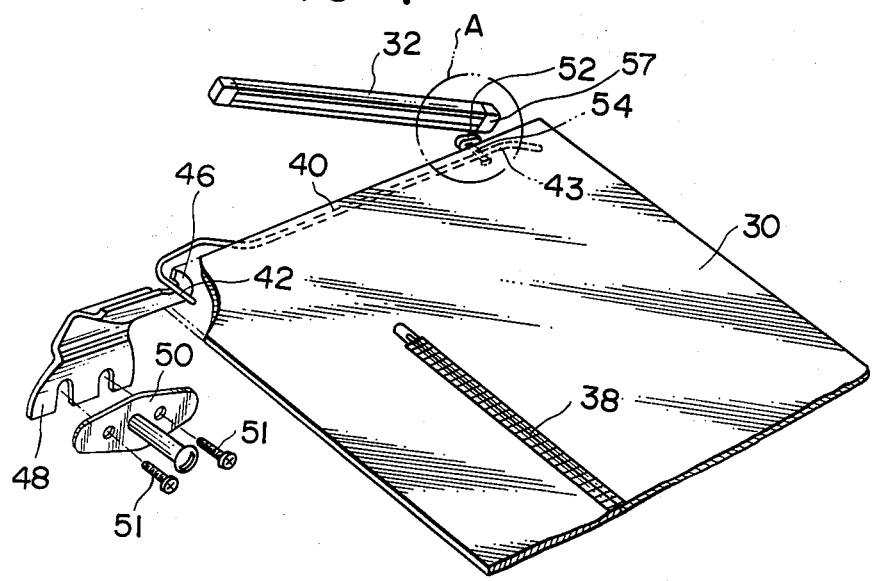
FIG. 4 is an enlarged partial perspective view of the luggage compartment cover according to the first embodiment of the invention.
Figure 5:
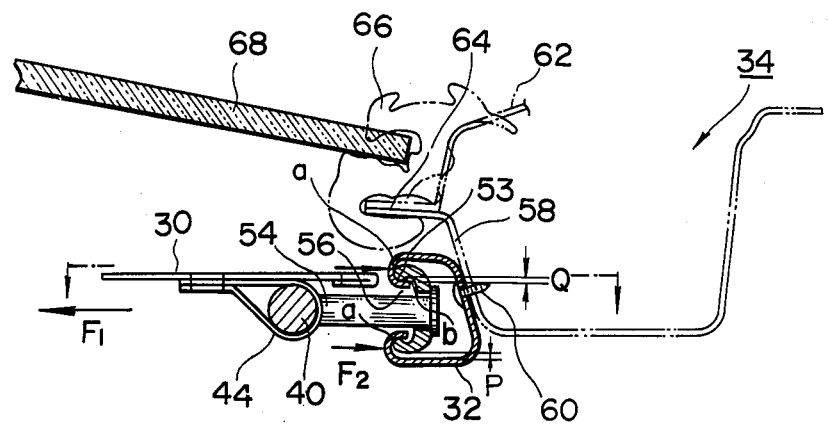
FIG. 5 is a further enlarged cross-section of an area A encircled within a chain-line in FIG. 4, illustrating a guide means.

Referring to FIGS. 4 and 5, there is illustrated a first embodiment of the luggage compartment cover apparatus according to the present invention, in detail. The luggage compartment cover 30 is provided, on both sides thereof, with rods 40 respectively having an inwardly bent portion 42 on the front end thereof. Each rod 40 is received and held within a holder 44 formed by way of turning down the side edge of the cover 30 and by sewing it together. The rod acts as a stiffener therefor. The inwardly bent portion 42 is releasably engaged with a hook portion 46 formed on the bracket 48 so as to act as a pivot for the luggage compartment cover. As apparent from FIG. 4 the bracket 48 is fixed on the rear side panel 26 by means of a seat back striker 50 which is fixedly connected to the rear side panel 26 by screws 51. On the rear end, the luggage compartment cover 30 is slidably associated with the guide rail 32 by sliders 52 protruding sidewardly Each slider 52 is of cross-sectionally C-shaped configuration and is fitted to the free end of a shaft 54 which is secured at the other end thereof to the rear end 43 of the rod 40.

As apparent from FIG. 5, each guide rail 32 is of cross-sectionally channel-shaped configuration having an opening 56 to receive the shaft 54. The guide rail 32 is secured on an inner panel 58 of the rear door 34 by screws 60. The inner panel 58 is associated with an outer panel 62 to construct the rear door 34 in sectionally box-shape. On flange portions 64 of the inner and outer panels 58, 62, there is equipped a weather-strip 66 which is engaged with the lower end of the windshield 68.

Figure 6:
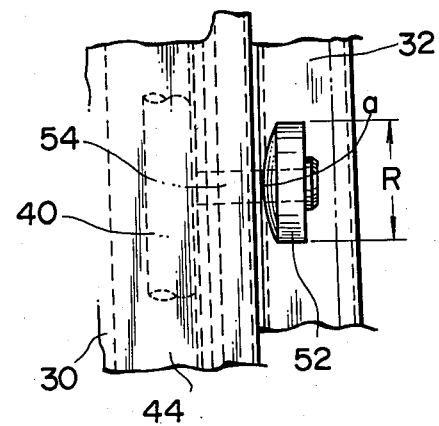
FIG. 6 is a still further enlarged fragmentary illustration as viewed along line VI—VI of FIG. 5.

As shown in FIGS. 5 and 6, the slider 52 has a width R which may be on the order of 20-mm., for example. The clearance P is larger than a clearance Q between the portion 53 of the slider 52 and point b of the guide rail 32 when the slider 52 is located at upper most position, as indicated by chain line. For example the clearance P is approximately 2-mm., while the clearance Q is approximately 0.25-mm. Thus, even if it locates downwardly with respect to the guide rail 32 the slider 52 contacts the guide rail 32 only at point b so as to reduce the force of friction.

Figure 7:
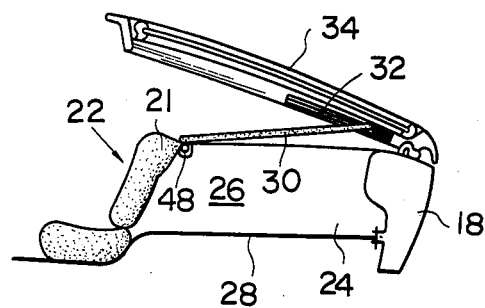
FIG. 7 is a cross-section taken along line VII—VII of FIG. 3.
Figure 8:
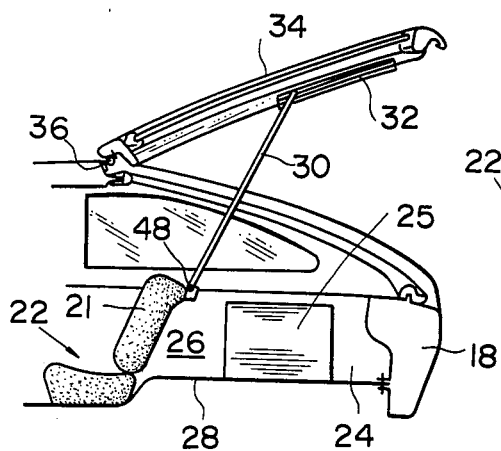
FIG. 8 is a cross-section taken along line VIII—VIII of FIG. 2.

The functions of the aforementioned luggage compartment cover apparatus are shown in FIGS. 7 and 8. As shown in FIG. 7, in a closed position of the rear door 34, the slider 52 of the luggage compartment cover 30 is located at the lower end of the guide rail 32. Thereby, the luggage compartment cover 30 is layed over the luggage compartment 24 to close it. In this position, since the guide rail 32 is gradually broadened in the lower or backward direction along the back pillar 20, in turn it is gradually narrowed in the upper direction, the rear end of the luggage compartment cover is laterally expanded or stretched so as to locate both side edges thereof under the weather strip 66 with tension acting on the luggage compartment cover itself in the direction of arrow $F_1$ on the order of 1.5~2 kg. The force of tending the slider in the direction of arrow $F_1$ may be sufficient to completely restrict the slider from movement. Thereby, the luggage compartment cover 30 can completely close the luggage compartment 24.

In the meanwhile, as shown in FIG. 8, when the rear door is opened, the slider 52 is moved to the upper or front end of the guide rail 32. Since the guide rail 32 is gradually narrowed in the direction of upward or frontward, the luggage compartment cover 30 is laterally contracted or reduced in its lateral dimension between both side edges with a substantially small force of reaction in the direction of arrow $F_2$ on the order of 0.5~1 kg so as to reduce friction between the slider and guide rail on the point a of FIG. 5. Thus, the slider 52 can smoothly slide along the guide rail 32. Further, laterally contracting the luggage compartment cover can eliminate any interference caused by opening the rear door 34 as well as any interference caused by abutting the side edge of the luggage compartment cover 30 against the inner edge of the back pillar 20.

In the drawings, reference number 57 denotes an end cap for closing a rear end opening of the guide rail 32. Thereafter, the luggage compartment cover 30 is wrapped compactly so as to be contained within the luggage compartment 24.

Figure 9:
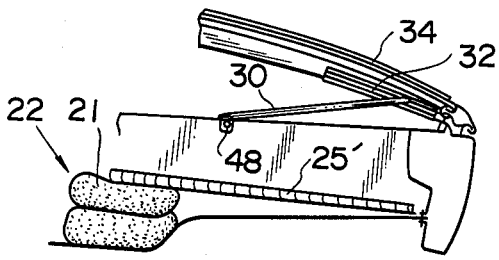
FIG. 9 is a similar cross-section to FIG. 8, wherein a long article is shown contained in the luggage room.
Figure 10:
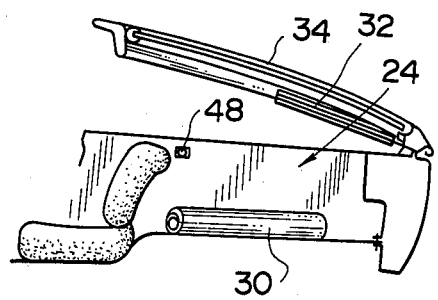
FIG. 10 is a similar cross-section to FIG. 8, wherein the luggage compartment cover has been released and contained in the luggage room.

FIG. 9 and 10 shows operational modifications of the luggage compartment cover apparatus as mentioned above In situations requiring the storage of a substantially long article 25', the seat back 21 of the rear seat 22 is thrown frontwardly to form a clearance to store the article 25' under the luggage compartment cover, as shown in FIG. 9. While in situations requiring the storage of a sustantially bulky article in the luggage compartment 24, the bent portion 42 of the rod 40 is disengaged from the hook portion 46 of the bracket 48. Then, the end cap 57 is released from the guide rail 32 and the slider 52 is moved out through the end opening of the guide rail 32.

Figure 11:
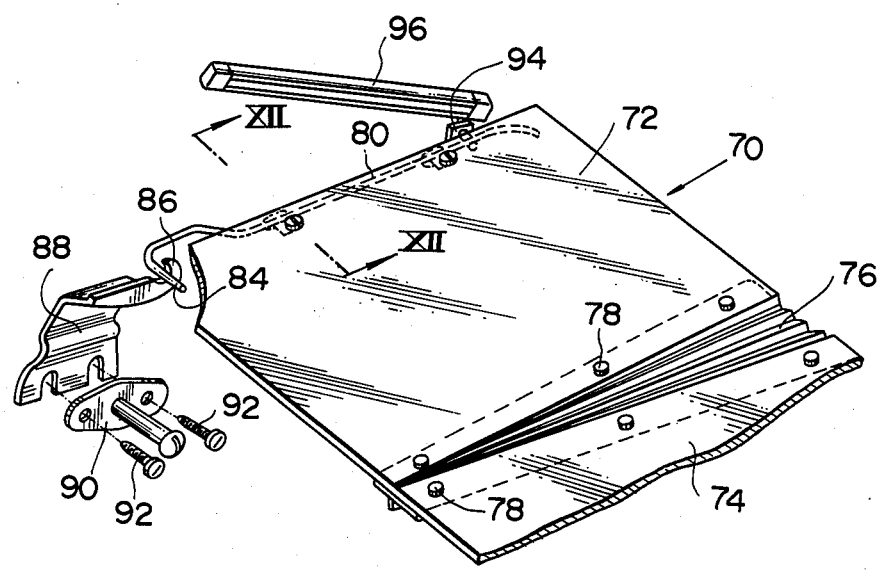
FIG. 11 is an enlarged partial perspective view, substantially similar to FIG. 8, but illustrating a luggage compartment cover apparatus according to the second embodiment of the invention.
Figure 12:
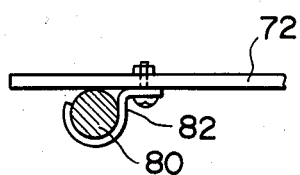
FIG. 12 is a further enlarged partial cross-section taken along line XII—XII of FIG. 11.

Referring to FIGS. 11 and 12, there is illustrated a luggage compartment cover apparatus according to the second embodiment of the invention. In this embodiment is employed a luggage compartment cover 70 comprising a pair of plates 72, 74 of non-flexible and/or ridged material such as hard-board, and an expansible connecting member 76 interposed between the plates 72, 74. As shown in FIG. 1., the member 76 comprises a flexible cornice laterally expansible. Thus, the member 76 can be expanded and contracted in the lateral direction so as to modify the lateral dimension between the plates 72, 74.

Although the second embodiment employs one laterally expansible connecting member on the central portion of the luggage compartment cover, the number and/or locations of the expansible member can be otherwise embodied without causing any difficulties to the persons who are skilled in the art.

Both sides of the member 76 are secured by means of rivets 78 on the inner side edges of the plates 72, 74 which are opposing one another through the member 76.

On each outer side of the plate 72, 74, there is maintained a rod 80 by means of hooks 82 secured on the plate 72, 74, as shown in FIG. 12. The rod 80 has a bent portion 84 on the front end thereof so as to engage with a hook 86 which is provided on a rear end of a bracket 88. The bracket 88 is secured on a rear side panel (not shown) by means of striker 90 and screws 92. On the other end of the rod 80 is laterally protruded a slider 94 slidably associated with a guide rail 96. The guide rail 96 is secured on the rear door (not shown) so that the guide rail is substantially parallel to the back pillar, in similar manner to the aforementioned first embodiment.

Thus constructed, the luggage compartment cover apparatus can function substantially similar to the first embodiment. Namely, in the stretched and closed position, the slider 94 is positioned at the rear end of the guide rail 96 to tend the plate 72, 74 laterally. Thus, the connecting expansible member 76 is expanded to completely close the luggage compartment (not shown). In the opened position, the slider 94 is located at the front end of the guide rail 96 to laterally compress the plate 72, 74. Thus, the connecting member 76 is contracted to prevent the luggage compartment cover 70 from interfering with the opening of the rear door.

Figure 13:
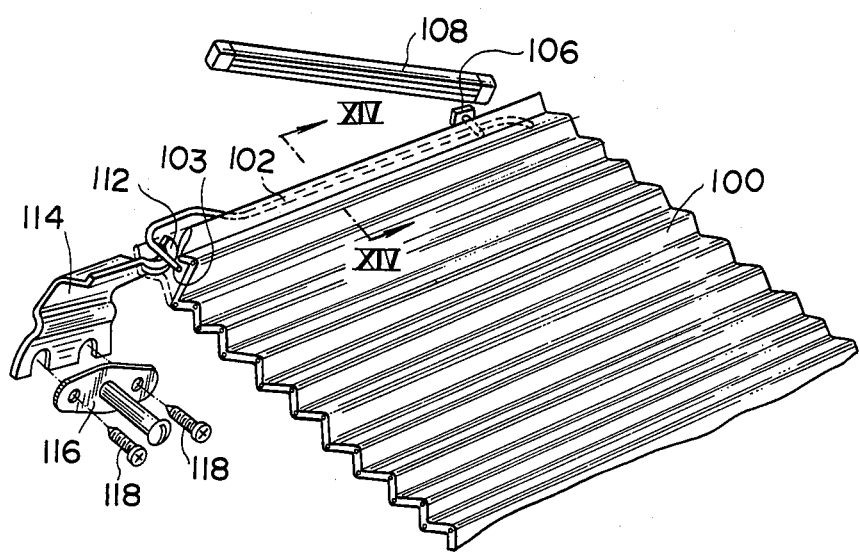
FIG. 13 is an enlarged partial perspective view, substantially similar to FIG. 4, illustrating a luggage compartment cover apparatus according to the third embodiment of the invention.
Figure 14:
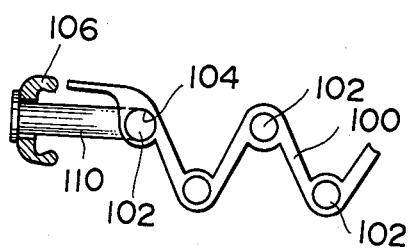
FIG. 14 is a further enlarged partial cross-section taken along line XIV—XIV of FIG. 13.

Referring to FIGS. 13 and 14, there is illustrated a luggage compartment cover apparatus in accordance with the third embodiment of the invention. A luggage compartment cover 100 is formed with corrugated flexibly falled material, the corrugating thereof being extended longitudinally to the body of the vehicle so as to provide expansibility in the lateral direction. A plurality of rods 102 are disposed through openings 104 provided in the luggage compartment cover 100 along respective turned portions as stiffeners. A slider 106 to be associated with a guide rail 108 is secured on the rear end of the lateral outermost rod 102 by a shaft 110 and protruded toward the lateral direction.

Each outermost rod 102 is provided with a bent portion 103 to engage with a hook 112 of a bracket 114. The bracket 114 is secured on a rear side panel (not shown) by a striker 116 and screws 118.

Thus constructed, the luggage compartment cover apparatus can close a luggage compartment (not shown) and prevent the contained luggage from being subjected to sunbeam or sight, and can be opened without causing interference between the side edge of the luggage compartment cover 100 and inner edge of a back pillar.

Thereby, the present invention can fulfill all the objects and advantages sought in the application.

While several embodiments have been described to illustrate the invention, it will be understood that the invention can be embodied otherwise without departing from the principles of the invention.

What is claimed is:

1. A luggage compartment cover apparatus for closing a luggage compartment of an automotive vehicle which has a rear opening and rear door, both side edges being gradually narrowed in the upward and frontward direction, comprising:
    a luggage compartment cover having connecting means pivotably connecting said luggage compartment cover to the vehicle body at the front end thereof, said cover being expandable in the lateral direction and substantially rigid in the longitudinal direction;
    a pair of sliders mounted to the rear end of said luggage compartment cover; and
    a pair of guide members mounted to respective sides of the automotive vehicle rear door interior so that the lateral spacing between said guide members is narrowed in the upward and frontward direction along the side edge of the door, each of said guide members slidably receiving respective said sliders to allow same to move therealong between a first position in which said luggage compartment cover is expanded to close said luggage compartment, and a second position in which said luggage compartment cover is contracted so as not to interfere with the door opening.

2. A luggage compartment cover apparatus as recited in claim 1, wherein said connecting means pivotally connecting said luggage compartment cover to the vehicle body comprises a pair of rods, each secured along respective side edges of said luggage compartment cover, and wherein each of said rods includes a bent section at the front end thereof to pivotally engage a pivot section provided on the vehicle body.

3. A luggage compartment cover apparatus as recited in claim 2 or 8, wherein said pivot section comprises a bracket equipped on the rear side panel of the vehicle body and having a hook portion to engage said bent section of said rod.

4. A luggage compartment cover apparatus as recited in claim 2, 3 or 8, wherein said rod acts as a stiffener along the sides of said luggage compartment cover.

5. A luggage compartment cover apparatus as recited in claim 1 or 8, wherein said guide member is secured on the inner side portion of the inner side panel of the rear door and is of a sectionally channel shaped configuration in which said slider being of a generally C-shaped configuration in cross-section is slidably received therein.

6. A luggage compartment cover apparatus as recited in claim 1 or 8, wherein said luggage compartment cover is formed of a stretchable and flexible material.

7. A luggage compartment cover apparatus as recited in claim 1 or 8, wherein said luggage compartment cover is formed of a plurality of substantially rigid board-like members and at least one expandable member, said board-like members being each joined together by an expandable member.

8. A luggage compartment cover apparatus for closing a luggage compartment of an automotive vehicle which has a rear opening and a rear door, both side edges being gradually narrowed in the upward and frontward direction, said apparatus comprising:
   a luggage compartment cover being expandable in the lateral direction and having a pair of rods, each secured along respective side edges of said cover, each of said rods including a bent section at the front end thereof to pivotally engage a pivot section provided on the vehicle body, and each of said rods including a slider mounted to the rear end thereof;
   a pair of guide members mounted to respective sides of the automotive vehicle rear door interior so that the lateral spacing between said guide members is narrowed in the upward and frontward direction along the side edge of the door, each of said guide members slidably receiving said slider to permit same to slide therein between a first position in which said luggage compartment cover is expanded to close said luggage compartment, and a second position in which said luggage compartment cover is contracted so as not to interfere with the door opening.

* * * * *